Dec. 2, 1924.
H. P. LAWTHER, JR
1,518,123
EXCITING MEANS FOR ELECTRODYNAMICAL OSCILLATORS
Filed Aug. 29, 1918
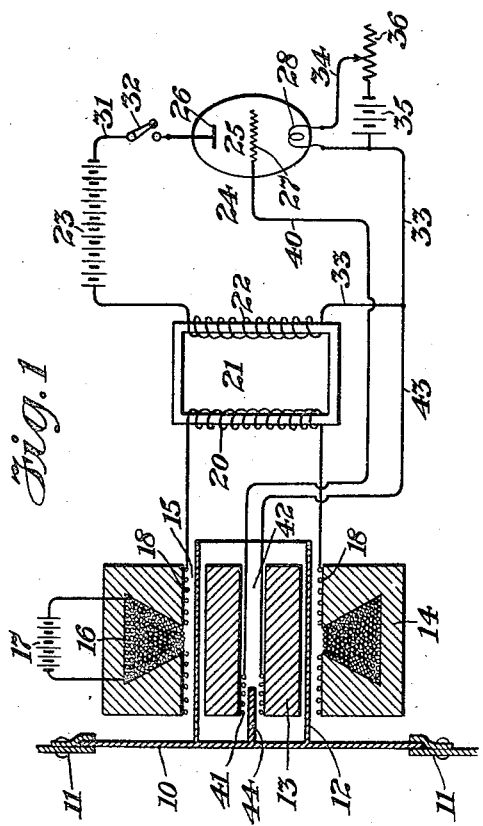
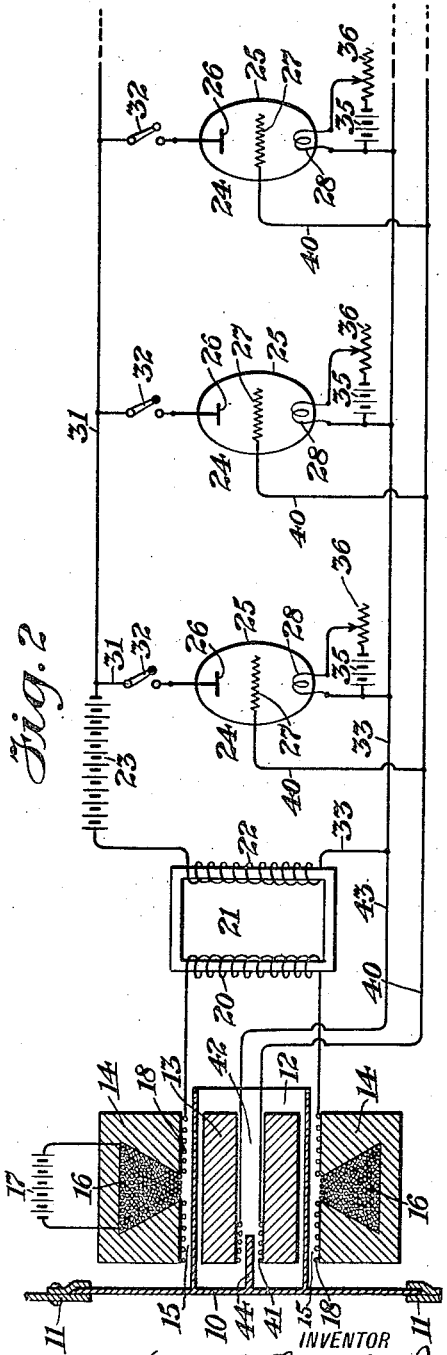
WITNESS
Chas. F. Clagett
INVENTOR
Harry P. Lawther Jr.
BY
A. J. Gardner
HIS ATTORNEY

Patented Dec. 2, 1924.

1,518,123

UNITED STATES PATENT OFFICE.

HARRY P. LAWTHER, JR., OF DALLAS, TEXAS, ASSIGNOR TO JOHN HAYS HAMMOND, JR., OF GLOUCESTER, MASSACHUSETTS.

EXCITING MEANS FOR ELECTRODYNAMICAL OSCILLATORS.

Application filed August 29, 1918. Serial No. 251,924.

*To all whom it may concern:*

Be it known that I, HARRY P. LAWTHER, Jr., a citizen of the United States, and a resident of Dallas, in the county of Dallas and State of Texas, have invented certain new and useful Improvements in Exciting Means for Electrodynamical Oscillators, of which the following is a specification.

Some of the objects of the present invention are to provide a means for producing alternating currents to excite an electro-dynamical oscillator to produce compressional waves employed in submarine signalling; to provide means to adjust the frequency of an alternating current for an oscillator to accord with the natural frequency of the vibrating diaphragm of the oscillator; to provide means for automatically maintaining the frequency of an alternating current for an oscillator substantially constant; and to provide other improvements as will hereinafter appear.

In the accompanying drawings Fig. 1 represents one form of an electro-dynamical oscillator embodying the present invention; and Fig. 2 represents a modified form of the same.

Referring to the drawings, and particularly to Fig. 1, a diaphragm 10 of relatively thin material, suitable for the purpose, is shown mounted for vibratory action in an opening provided in a rigid body 11, such as the hull of a vessel or other submerged part from which compressional waves are to be transmitted with water as the medium.

For the purpose of vibrating the diaphragm 10 an electro-dynamical oscillator is employed consisting of a copper cylinder 12, which is rigidly secured to the diaphragm 10, and encircles but does not contact with an iron core 13. The cylinder 12 in turn is encircled by an electro-magnet 14 but is out of contact therewith and it will therefore be evident that the cylinder 12 lies in the air gap 15 formed between the magnet 14 and the core 13. The magnet 14 is energized by a winding 16 receiving current from a battery 17 or like source, while a second winding 18 is coiled within the air gap 15 around but spaced from the cylinder 12. The winding 18 is in circuit with a secondary coil 20 of a transformer 21 and the alternating current induced in this coil 20, as will be explained, serves to reciprocate the copper cylinder 12 and with it the diaphragm 10.

In order to produce the controlled current for exciting the oscillator the transformer 21 has a primary coil 22 in a circuit including a high potential battery 23 and a thermionic valve 24 consisting of an air exhausted glass bulb 25, a terminal or anode 26, a grid or potential gradient changing means 27, and a normally heated filament cathode 28. The battery 23 is electrically connected to the terminal 26 by a conductor 31 having a control switch 32 therein while the filament 28 is connected to the transformer primary 22 by a conductor 33. A local normally closed circuit 34 including a battery 35 and a rheostat 36 serves to maintain the filament 28 heated for the purpose intended.

For the purpose of causing the potential of the grid 27 to fluctuate and thus automatically adjust the frequency of the alternating current to accord with the natural frequency of the vibrating diaphragm 10, a conductor 40 leads from the grid 27 to a coil 41 located in an axial bore 42 of the core 13 and the opposite end of this coil 41 is connected by a conductor 43 to the conductor 33 of the thermionic valve circuit. The coil 41 is arranged to encircle one pole of a permanent bar magnet 44, which is rigidly attached to the diaphragm 10, and consequently any movement or vibratory action of the diaphragm 10 causes the free end of the magnet 44 to move back and forth in the coil windings 41, thus changing the direction of the current in the coil 41 and giving rise to a potential difference between the grid 27 and the filament 28.

For obtaining high power the number of thermionic valves 24 may be increased to meet conditions and in Fig. 2 such a form of the invention is shown employing three thermionic valves 24 which are connected in parallel across the primary circuit leads 31 and 33 and to the conductor 40 of the grid potential varying means.

In the operation of the device the switch 32 is closed thereby causing the battery 23 to discharge through the coil 22 and the ionized space between the filament 28 and the terminal 26. This first rush of current gives rise to a transient current in the coil 20 and winding 18 whereby a mechanical impulse is transmitted to the cylinder 12 and diaphragm 10, both of which are moved in one direction. This movement of the diaphragm 10 causes the bar magnet 44 to move relative to its encircling coil 41 thereby establishing a potential difference between the grid 27 and the filament 28 with the result that a change in the current of the transformer primary 22 takes place and the induced current in the coil 20 and the winding 18 will give the cylinder 12 and the diaphragm 10 a further impulse in the same direction as originally received. The effect of the impulse continues until the elastic restoring force of the diaphragm overcomes the electrical driving force whereupon the diaphragm 10 moves in the return or opposite direction. This causes the magnet 44 to also move in the opposite direction thereby reversing the direction of the induced current in the coil 41 and the electrical driving force again acts to drive the diaphragm in this reversed direction until again the elastic restoring force acts to reverse condition. In this way the diaphragm is maintained in vibration, it being understood that the induced currents act in rapid succession and the reversal of movement of the diaphragm is substantially instantaneous and continuous while the switch 32 is closed.

While the foregoing description has been with reference to a vibrator for the production of compressional waves employed in submarine signalling, it will be understood that the device is not limited to such use and the invention broadly considered includes a vibratory device for the excitation of bells, strings, musical instruments, signalling devices or the like.

It will now be apparent by the device of the present invention that the frequency of an alternating current is automatically adjusted to the natural frequency of the vibrating diaphragm and whatever slight changes in the natural period of the diaphragm take place because of temperature changes or the like are at once corrected and compensated for, since the induced current is directly under the control of the diaphragm movement.

Having thus fully described my invention, I claim:

1. In a signalling system, the combination with a mechanically vibratory element having a natural period of mechanical vibration, of means for vibrating said element including a thermionic valve, and means for varying the potential impressed on the grid circuit of the valve by and in accordance with the vibrations of said vibrating element.

2. In a signalling system, the combination with a mechanically vibratory element having a natural period of mechanical vibration and free to be vibrated in that period, of means for vibrating said element including a source of electrical energy, a circuit arranged to permit a flow of energy from said source and including a thermionic valve, and means for varying the potential impressed on the grid circuit of said valve by and in accordance with the vibrations of the vibrating element.

3. In a signalling system, the combination with a mechanically vibratory element including a diaphragm, a hollow electrically conductive cylinder secured thereto and carried by said diaphragm, and a permanent magnet extending within said cylinder and secured to and carried by said diaphragm, of a stationary annular electro-magnet surrounding said cylinder, a hollow core arranged within said cylinder, a coil arranged within said electro-magnet and surrounding said cylinder and means for producing electrical oscillations in said coil including a thermionic valve comprising a container, a heated cathode, an anode and a grid within said container, a source of electrical energy in series with said cathode and said anode acting through said cathode and said anode to produce oscillations in said coil, and means for varying the potential impressed on the grid circuit of the valve by and in accordance with the vibrations of said vibrating element.

Signed at New York, in the county of New York and State of New York, this 28th day of August, A. D. 1918.

HARRY P. LAWTHER, Jr.